(12) United States Patent
Petrosyan et al.

(10) Patent No.: US 9,054,573 B2
(45) Date of Patent: Jun. 9, 2015

(54) THREE-PHASE ASYNCHRONOUS ENGINE (VARIANTS)

(76) Inventors: Vachagan Petrosyan, Yerevan (AM); Hrayr Aharonyan, Yerevan (AM)

( * ) Notice: Subject to any disclaimer, the term of this patent is extended or adjusted under 35 U.S.C. 154(b) by 350 days.

(21) Appl. No.: 13/500,870

(22) PCT Filed: Sep. 10, 2010

(86) PCT No.: PCT/AM2010/000002
§ 371 (c)(1),
(2), (4) Date: Apr. 6, 2012

(87) PCT Pub. No.: WO2011/044594
PCT Pub. Date: Apr. 21, 2011

(65) Prior Publication Data
US 2012/0200192 A1    Aug. 9, 2012

(30) Foreign Application Priority Data
Oct. 14, 2009  (AM) .................................. 20090123

(51) Int. Cl.
*H02K 17/16* (2006.01)
*H02K 17/02* (2006.01)

(52) U.S. Cl.
CPC ............. *H02K 17/16* (2013.01); *H02K 17/02* (2013.01)

(58) Field of Classification Search
CPC ...... H02K 17/16; H02K 17/02; H02K 41/025
USPC ............ 310/268, 216.001, 216.008, 216.011
See application file for complete search history.

(56) References Cited

U.S. PATENT DOCUMENTS

| | | | | |
|---|---|---|---|---|
| 4,114,583 A | * | 9/1978 | Sleder et al. | 123/406.57 |
| 4,159,434 A | * | 6/1979 | Kalsi | 310/168 |
| 4,187,441 A | | 2/1980 | Oney | |
| 4,288,709 A | * | 9/1981 | Matthias et al. | 310/49.23 |
| 5,334,898 A | * | 8/1994 | Skybyk | 310/268 |

(Continued)

FOREIGN PATENT DOCUMENTS

| | | |
|---|---|---|
| GB | 1 537 138 A | 12/1978 |
| RU | 2 041 547 C1 | 8/1995 |

(Continued)

OTHER PUBLICATIONS

International Search Report, Dec. 17, 2010, from International Phase of the instant application.

*Primary Examiner* — Thanh Lam
(74) *Attorney, Agent, or Firm* — Jackson Patent Law Office

(57) ABSTRACT

The invention concerns the electric asynchronous engines including a rotor as a flat disc, and a stator, which is coaxial to the rotor, and is installed with a working backlash relative to the rotor's disk. The stator includes three laminated packages of cores with phase coils, which are situated around the shaft of the motor under 120° angle, one in relation to other. The cores' packages are enclosed between the first and the second flat base plates, which are executed from nonconductive material, and the planes of the base plates are perpendicular to the axis of the shaft. The cores are executed as rectilinear laminated packages, and their axes are parallel to the shaft's axis. The second base plate is identical to the first one, and the butt-ends of the other side of the cores' packages are fixed in it. The invention is presented in three variants, where different fulfillments of the motor are shown: with a sectioned stator, with a sectioned rotor or with the stator and the rotor both sectioned.

5 Claims, 3 Drawing Sheets

(56) References Cited

U.S. PATENT DOCUMENTS

| | | | |
|---|---|---|---|
| 5,801,473 A * | 9/1998 | Helwig | 310/216.061 |
| 2006/0103263 A1* | 5/2006 | Naito et al. | 310/268 |
| 2007/0001540 A1* | 1/2007 | Matsuzaki et al. | 310/268 |
| 2008/0001495 A1* | 1/2008 | Qu et al. | 310/268 |
| 2010/0148611 A1* | 6/2010 | Wang et al. | 310/156.37 |

FOREIGN PATENT DOCUMENTS

| | | |
|---|---|---|
| RU | 2 111 599 C1 | 5/1998 |
| RU | 2 158 999 C2 | 11/2000 |
| RU | 2 284 426 C1 | 9/2006 |
| SU | 1 728 938 A1 | 4/1992 |

* cited by examiner

B - B

THREE-PHASE ASYNCHRONOUS ENGINE (VARIANTS)

FIELD OF THE INVENTION

The invention concerns the electric asynchronous engines (induction motor) including a rotor as a flat disc, and a stator, which is coaxial to the rotor, and is installed with a working backlash relative to the rotor's disk.

Such motors profitably differ from the traditionally known induction motors with a "squirrel cage" rotor by a whole range of characteristics:
  reduced material consumption and weight,
  reduced labor intensiveness of manufacturing,
  simplicity and manufacturability of construction.

BACKGROUND OF THE INVENTION

The known three-phase asynchronous engine includes a rotor in a form of a flat disk made of non-magnetic electroconductive material, rigidly fixed on a steel shaft in a plane which is perpendicular to the axis of the shaft; a stator, which is coaxial to the shaft, and is installed with a working backlash relative to the plane of a rotor's disk, the stator includes three L-shaped laminated packages of cores with phase coils, situated around the shaft of the motor under 120° angle, one in relation to other, and are enclosed between the first and the second flat base plates. The plates of the bases are executed from nonconductive material, and their planes are perpendicular to the shaft's axis. The bearings of the shaft are installed in the centre of each base plate. There are through windows on the first base plate, where the end faces of the cores' one side are fixed (patent AM 852 A2, HO2K17/04, 22.06.2000).

The lack of the known construction is the low manufacturability:
  the cores' packages are laminated from L-shaped plates,
  the base plates are not identical,
Besides that, the abilities of sectionalization of the known construction are limited with one pair of the sections.

The aim of the invention is to raise the manufacturability of the construction and to expand the range of the motor's modifications by the way of providing ability of unlimited sectionalization of the rotor, as well as the stator.

SUMMARY OF THE INVENTION

The invention is presented in three variants.

The essence of the invention, according to the first variant, is that the asynchronous engine that includes a rotor in a form of a flat disc from nonmagnetic electroconductive material, rigidly fixed on a steel shaft in a plane, which is perpendicular to the axis of the shaft; a stator, which is coaxial to the shaft, is installed with a working backlash relative to the plane of the rotor's disc and includes three laminated packages of cores with phase coils, situated around the shaft of the motor under 120° angle, one in relation to other, and are enclosed between the first and the second flat base plates, which are executed from nonconductive material, and their planes are perpendicular to the shaft's axis; the bearings of the shaft, which are installed on the base plates and there are through windows on the first base plate, where the end faces of the cores' one side are fixed, according to the invention, includes cores, executed as rectilinear laminated packages, and their axes are parallel to the axis of the shaft, moreover, the second base plate is identical to the first base plate and the end faces, that are on the other side of the cores, are fixed in it.

The essence of the invention, according to the first variant, is also that the rotor is sectioned and consists of two identical discs; and the stator is sectioned and has two identical sections of the mentioned construction; and also that the rotor is sectioned, as well as the stator.

The essence of the invention, according to the second variant, is that the stator of the mentioned induction motor is sectioned and consists of consecutive sections, which are coaxially installed on a common shaft. In the two end sections the cores are executed as L-shaped laminated packages with phase coils on the long arms, and in the intermediate sections the cores are executed as rectilinear laminated packages, and the axes of the cores are parallel to the axis of the shaft, moreover, the second base plates of the intermediate section of the stator are identical to the first base plates, and the other end faces of the rectilinear laminated packages of the cores are fixed in them. The rotor is also sectioned from two identical discs, which are coaxially installed on a common shaft between the sections of the stator, with working backlashes.

The essence of the invention, according to the second variant, also lies in the number of the intermediate sections of the stator being more than one, and that each section of the rotor is placed between the adjacent sections of the stator.

The essence of the invention, according to the third variant, is that the stator of the mentioned induction motor is combined from the first and the second identical halves, and the cores of the halves are executed as rectilinear laminated packages with axes, which are parallel to the axis of the shaft and are installed between the same pair of base plates, moreover, the second half's cores with phase coils are turned around the axis of the shaft under 60° angle in relation to the first half's cores with phase coils. Both base plates are identical and there are through windows on both of them, where the end parts of the packages of the cores are fixed. The number of the through windows corresponds with the number of the cores.

The essence of the invention, according to the third variant, is also that the rotor is sectioned and consists of two identical discs, that the stator is sectioned and consists of two identical sections of the mentioned construction, and that the stator is sectioned, as well as the rotor.

The essence of the invention is explained on the drawings.

DETAILED DESCRIPTION OF THE INVENTION

Figure 1:
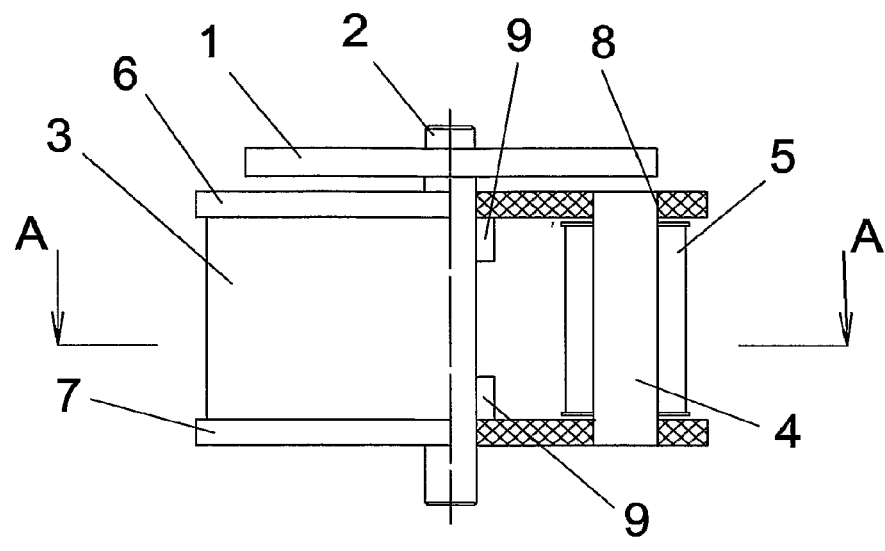
FIG. 1 schematically illustrates the motor according to the first variant in a partial section.

The motor contains a rotor as a flat disc 1, made of non-magnetic electroconductive material, such as aluminum or copper, which is fixed on a steel shaft 2 in a plane, which is perpendicular to the shaft's axis. Stator 3 is installed with a working backlash in regard to the surface of the disc 1 of rotor coaxially to the shaft 2 and includes three cores 4, situated around the shaft under 120° angle, one in relation to other, with phase coils 5. The cores 4 are executed as laminated packages and are enclosed between the first 6 and the second 7 flat base plates. The plates 6 and 7 are installed in planes, which are perpendicular to the shaft's axis 2 and are executed from insulating material, such as textolite. There are through windows 8 on the first plate 6 and the dimensions of the windows correspond with the section of the cores. The ends on one of the sides of the cores are fixed in the through windows 8 and are faced to the flat surface of the rotor's disc 1.

The motor's shaft 2 is supplied with bearings 9, which are installed on plates 6 and 7. The bearings can be also executed from nonmetallic material, such as phtoroplast, as the sliding bearings.

The merger of the plates 6 and 7 is realized by four threaded rods 16, which are parallel to the axis of the motor's shaft, and nuts.

Figure 2:
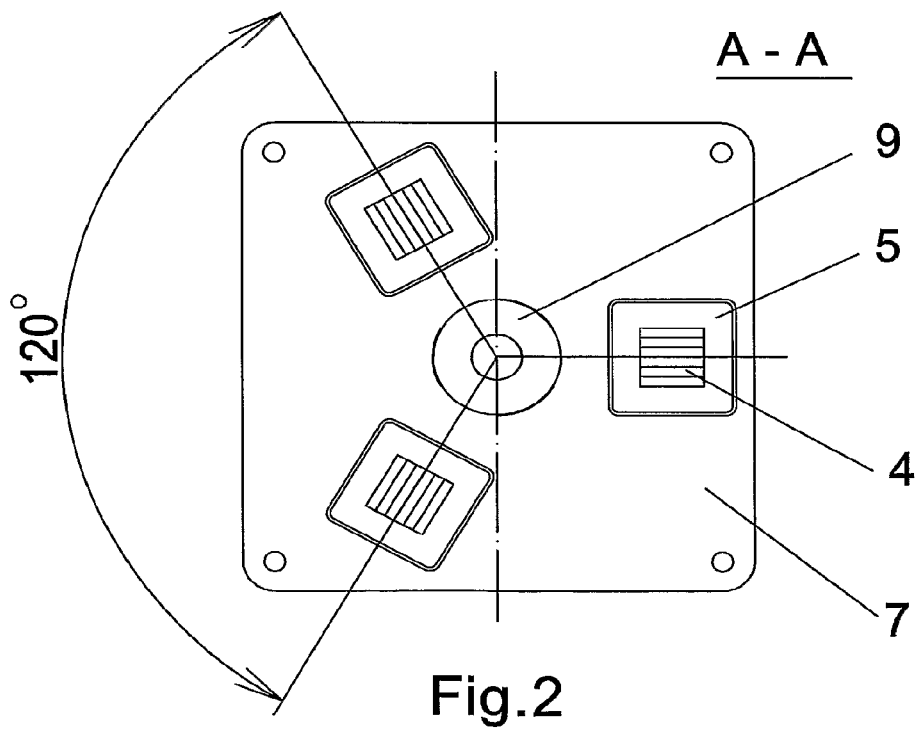
FIG. 2 illustrates the section of the stator according to A-A on FIG. 1.

According to the first variant of the invention, the cores 4 are executed as rectilinear laminated packages, and their axes are parallel to the axis of the shaft 2. Moreover, the second base plate 7 is executed identically to the first base plate, in other words, again there are through windows on it, which are situated in the vertices of a regular triangle, and the second end faces of the cores are fixed in them (FIGS. 1 and 2). The identity of plates 6 and 7, as well as the execution of the cores 4 as packages from rectilinear plates, raise the manufacturability and the maintainability of the construction. Moreover, the construction allows using the internal volume of the stator more effectively, as coils 5 can abut to the internal surfaces of plates 6 and 7.

Figure 3:
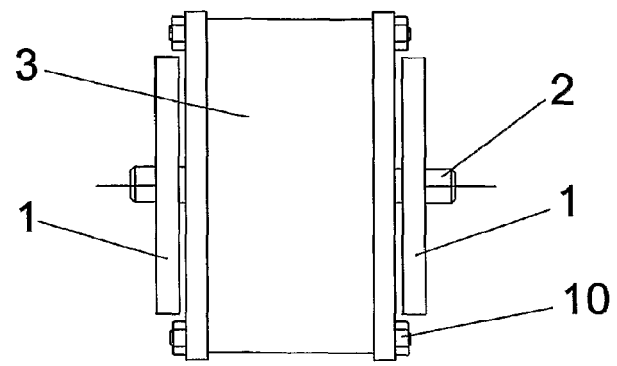
FIG. 3 schematically illustrates the motor with a sectioned rotor.

In one of the forms of realization the rotor is sectioned and consists of two identical discs 1, which are coaxially installed on a common shaft 2 on either sides of the stator 3 with working backlashes, forming a sort of electric motor with a stator on the inside and a rotor on the outside, as it is illustrated on FIG. 3.

Figure 4:
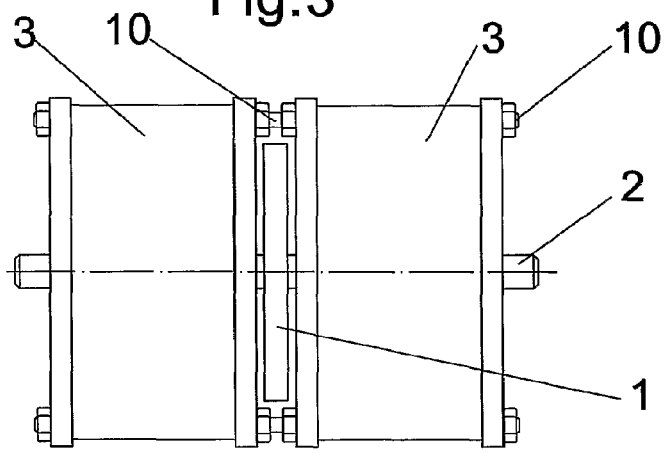
FIG. 4 schematically illustrates the motor with a sectioned stator.

In another form of realization the stator is sectioned and consists of two identical sections 3 of the mentioned construction, which are coaxially installed on a common shaft 2 on either sides of the rotor 1 with working backlashes, as it is illustrated on FIG. 4.

Figure 5:
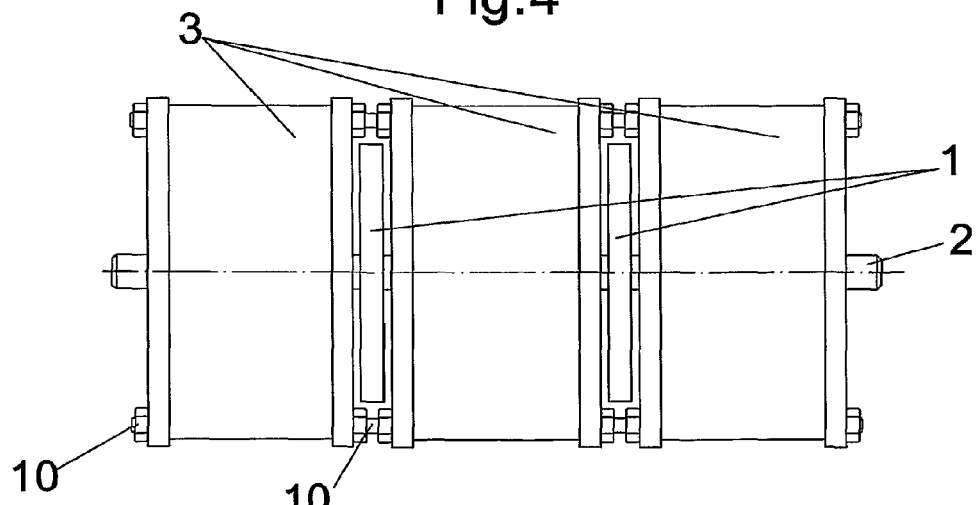
FIG. 5 schematically illustrates the motor with a sectioned stator and a sectioned rotor.

In one more form of realization the stator is sectioned, as well as the rotor: the stator is executed from identical sections 3 of the mentioned construction, which are coaxially installed on a common shaft 2, and the rotor is executed from identical discs 1, which are coaxially installed on a common shaft 2 between the sections 3 of the stator with working backlashes, as it is shown on FIG. 5. FIG. 5 illustrates three sections of the stator; however, the sections can be more than three, depending on specific requirements.

Figure 6:
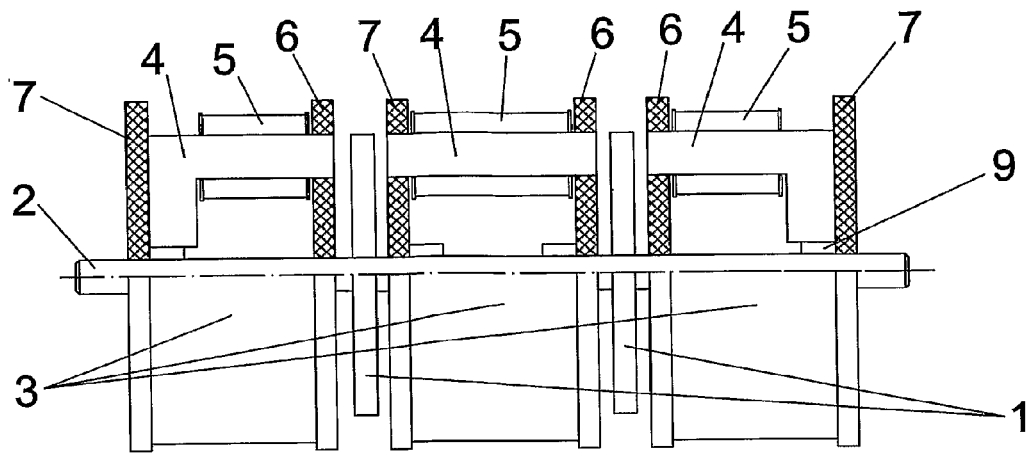
FIG. 6 schematically illustrates the motor according to variant 2 in a partial section.

According to the second variant of the invention, the stator is sectioned and consists of two identical consecutive sections 3, which are coaxially installed on a common shaft 2. In the two of the end sections the cores 4 are executed as L-shaped laminated packages with phase coils 5 on the long arms, whereas in the intermediate sections the cores 4 are executed as rectilinear laminated packages, and their axes are parallel to the axis of the shaft 2. The second plates 7 of the stator's intermediate sections are identical to the first plates 6, so again there are through windows on them, which are situated on the vertices of a regular triangle, and the second ends of the rectilinear packages of the cores are fixed in them. The motor's rotor is also sectioned and consists of two identical discs 1, which are coaxially installed on a common shaft between the sections 3 of the stator with working backlashes (FIG. 6). The end sections 3 are installed in a way, so that the butt-ends of the long arms of the L-shaped cores face the flat surfaces of the disks of the rotor's corresponding sections. FIG. 6 illustrates only one intermediate section of the stator, however, the number of the sections can be more than one, depending on specific requirements, moreover, each section of the rotor is enclosed between the sections of the stator.

Figure 7:
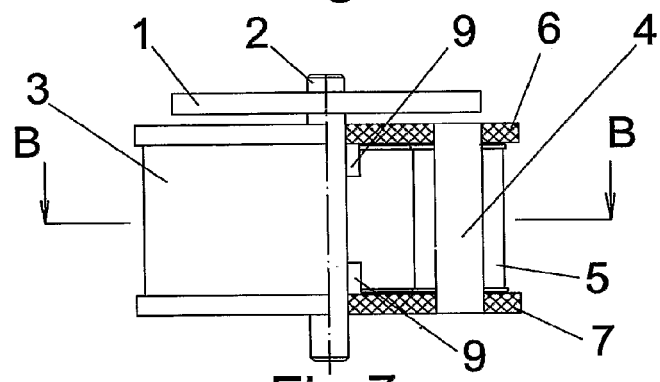
FIG. 7 schematically illustrates the motor according to variant 3 in a partial section.
Figure 8:
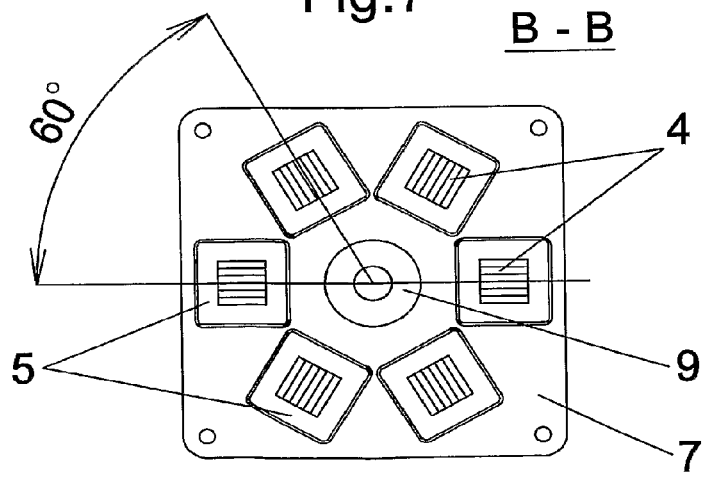
FIG. 8 illustrates the section of the stator according to B-B on FIG. 7.

According to the third variant of the invention, the stator is combined from the first and the second identical halves. Each half contains three cores 4 as rectilinear laminated packages with axes, which are parallel to the axis of the shaft 2. Each half's cores with phase coils 5 are enclosed between the same pair of base plates 6 and 7, moreover, the cores with phase coils of the second half are turned around the axis of the shaft under 60° angle, in relation to the first half' s cores with phase coils. Both base plates are identical and there are through windows on each of them. The number of the through windows corresponds with the number of the cores. So there are six windows situated on the vertices of a regular hexagon in both plates. The ends of the cores' packages are fixed in the windows of this pair of plates (FIGS. 7 and 8).

In one of the forms of realization the rotor is sectioned and consists of two identical discs 1, which are coaxially installed on a common shaft 2 on either sides of the stator 3 with working backlashes, forming a sort of electric motor with a stator on the inside, and a rotor on the outside, as it is shown on FIG. 3.

In another form of realization the stator is sectioned and consists of two identical sections 3 of the mentioned construction, which are coaxially installed on a common shaft 2 on either sides of the rotor 1 with working backlashes, as it is shown on FIG. 4.

In one more form of realization the stator and the rotor are both sectioned: the stator consists of two identical sections 3 of the mentioned construction, which are coaxially installed on a common shaft 2, and the rotor consists of two identical discs 1, which are coaxially installed on a common shaft 2 between the sections 3 of the stator with working backlashes, as it is shown on FIG. 5. FIG. 5 illustrates three sections of the stator; however, the sections can be more than three, depending on specific requirements.

FIGS. 2 and 8 illustrates square configuration of the base plates 6 and 7, however, depending on assembly requirements, they can have different outlines: as a polygon, a circle or other.

The invention claimed is:

1. A three-phase asynchronous engine including a rotor as a flat disk from non-magnetic electro conductive material, rigidly fixed on a steel shaft in a plane which is perpendicular to the axis of the shaft; a stator which is coaxial to the shaft, and is installed with a working backlash relative to the plane of a rotor's disk, and includes three laminated packages of the cores with phase coils, situated around the shaft of the motor under 120° angle, one in relation to other, and are enclosed between the first and the second flat base plates, which are executed from nonconductive material, and their planes are perpendicular to the shaft's axis; and bearings of the shaft, which are installed on the base plates, and there are through windows on the first base plate, where the butt-ends of one side of the cores' packages are fixed, characterized by that the cores of the stator are executed as rectilinear laminated packages, and the axes of the cores are parallel to the axis of the shaft, moreover the second base plate is identical to the first one, and the butt-ends of the other side of the cores' packages are fixed in it.

2. The asynchronous engine, according to claim 1, characterized by that the rotor is sectioned and consists of two identical discs, which are coaxially installed on a common shaft on either sides of the stator with working backlashes.

3. The asynchronous engine, according to claim 1, characterized by that the stator is sectioned and consists of two identical sections of the mentioned construction, which are coaxially installed on a common shaft on either sides of the rotor with working backlashes.

4. The asynchronous engine, according to claim 1, characterized by that the stator is sectioned and consists of identical sections, which are coaxially installed on a common shaft, and the rotor is also sectioned and consists of identical discs, which are coaxially installed on a common shaft between the sections of the stator with working backlashes.

5. The asynchronous engine, according to claim 2, with the rotor, which is sectioned and consists of two identical discs from non-magnetic electro conductive material, which are coaxially installed on a common shaft on either sides of the stator with working backlashes relative to the planes of the rotor's both disks rigidly fixed on a steel shaft in a plane, which is perpendicular to the axis of the shaft; a stator, which is coaxial to the shaft, and includes three laminated packages of cores with phase coils, which are situated around the shaft of the motor under 120° angle, one in relation to other, and are fixed between the first and the second flat base plates, which are executed from nonconductive material, and their planes are perpendicular to the shaft's axis; and bearings of the shaft, which are installed on the base plates, and there are through windows on the first base plate, where the butt-ends of the cores' packages are fixed, characterized by that the stator is combined from the first and the second identical halves, and the halves' cores are executed as rectilinear laminated packages with axes, which are parallel to the axis of the shaft and are enclosed between the same pair of base plates, moreover, the second half's cores with phase coils are turned around the axis of the shaft under 60° angle, in relation to the first half's cores with phase coils, and both base plates are identical and include through windows, where the end parts of the core's packages are fixed, the number of the through windows corresponds with the number of the cores.

* * * * *